(12) United States Patent
Haspekian et al.

(10) Patent No.: US 9,071,690 B2
(45) Date of Patent: Jun. 30, 2015

(54) CALL TRANSFER PROCESSING IN SIP MODE

(75) Inventors: Goar Haspekian, Paris (FR); Marianne Mohali, Courbevoie (FR); Stephen Jaffuel, Issy les Moulineaux (FR)

(73) Assignee: France Telecom, Paris (FR)

( * ) Notice: Subject to any disclaimer, the term of this patent is extended or adjusted under 35 U.S.C. 154(b) by 62 days.

(21) Appl. No.: 13/817,506

(22) PCT Filed: Aug. 12, 2011

(86) PCT No.: PCT/FR2011/051911
§ 371 (c)(1),
(2), (4) Date: Feb. 18, 2013

(87) PCT Pub. No.: WO2012/022909
PCT Pub. Date: Feb. 23, 2012

(65) Prior Publication Data
US 2013/0142085 A1 Jun. 6, 2013

(30) Foreign Application Priority Data

Aug. 17, 2010 (FR) .................................... 10 56634

(51) Int. Cl.
*H04M 3/54* (2006.01)
*H04L 29/06* (2006.01)

(52) U.S. Cl.
CPC .............. *H04M 3/54* (2013.01); *H04L 65/1003* (2013.01); *H04L 65/1006* (2013.01); *H04L 65/1016* (2013.01); *H04L 65/1069* (2013.01); *H04L 65/1096* (2013.01); *H04L 65/1093* (2013.01)

(58) Field of Classification Search
CPC ............ H04L 65/1006; H04L 65/1069; H04L 65/1003; H04M 3/54
USPC ............................ 370/254–350; 709/254–350
See application file for complete search history.

(56) References Cited

U.S. PATENT DOCUMENTS

| 2008/0037447 | A1 | 2/2008 | Garg et al. | |
|---|---|---|---|---|
| 2009/0268712 | A1* | 10/2009 | Bottiero et al. | 370/352 |
| 2010/0215037 | A1* | 8/2010 | Long et al. | 370/352 |

FOREIGN PATENT DOCUMENTS

EP 2093968 A1 8/2009

OTHER PUBLICATIONS

International Preliminary Report on Patentability and English translation of the Written Opinion dated Feb. 19, 2013 for corresponding International Application No. PCT/FR2011/051911, filed Aug. 12, 2011.
International Search Report and Written Opinion dated Dec. 19, 2011 for corresponding International Application No. PCT/FR011/051911, filed Aug. 12, 2011.
French Search Report and Written Opinion dated Jun. 10, 2011 for corresponding French Application No. 1056634, filed Aug. 17, 2010.

* cited by examiner

*Primary Examiner* — Ayaz Sheikh
*Assistant Examiner* — Debebe Asefa
(74) *Attorney, Agent, or Firm* — David D. Brush; Westman, Champlin & Koehler, P.A.

(57) ABSTRACT

Methods and devices for supervising a transfer of a call or of processing a call set up between first and second terminals in a communications network implementing an SIP type signaling protocol. The method is implemented after sending or receiving, as the case may be, a command to transfer the already-set up call to a call between the first terminal and a third terminal. The supervision method obtains an item of information relating to setting up the call between the first and third terminals and sends a command to resume the call between the first and second terminals as a function of whether at least one non-set up criterion is true. The processing method transmits information relating to setting up the call between the first and third terminals and sets up a call between the first and second terminals as a function of whether the resumption command is received.

14 Claims, 3 Drawing Sheets

CALL TRANSFER PROCESSING IN SIP MODE

CROSS-REFERENCE TO RELATED APPLICATIONS

This Application is a Section 371 National Stage Application of International Application No. PCT/FR2011/051911, filed Aug. 12, 2011, which is incorporated by reference in its entirety and published as WO 2012/022909 on Feb. 23, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of telecommunications, and more particularly in the field of telephony over IP known as "voice over IP" (VoIP).

BACKGROUND OF THE DISCLOSURE

The Internet protocol (IP) network is becoming more and more the universal medium for a multitude of services and applications. It is the federating network adopted by operators for mutualizing their heterogeneous offers of services.

Telephony over IP advantageously makes it possible firstly to reduce the cost of telephone calls compared with conventional telephony, and secondly to couple the telephone with the functions and computer services of IP networks.

Telephony over IP also enables functions to be implemented that are already present on the public switched telephone network (PSTN). By way of example, such a function is a call transfer service enabling a called party who has been called by a calling party to transfer the call to a third party.

The transfer is said to be "consultative" if the called party engages in communication with the third party before transferring the call from the calling party.

The transfer is said to be "blind" if the transfer is implemented without consultation. A "blind" transfer achieves a saving in time and is often used by telephone switchboards, such as a business switchboard or in a call center.

In networks, e.g. voice networks, that make use of the session initiation protocol (SIP) for signaling as standardized by the Internet engineering task force (IETF), the "blind" transfer service is implemented by performing a method known as "REFER".

In known manner, the SIP protocol makes it possible to initiate, to modify, or to terminate multimedia sessions. Once negotiation has been achieved between a calling party and a called party, the two parties may exchange media streams, e.g. voice or video, by activating a data transfer protocol, e.g. the real time transport protocol (RTP). The SIP protocol manages only the signaling messages and not the data messages of a multimedia session. The parameters of multimedia sessions are pre-negotiated via the SIP signaling messages. These parameters are mainly the termination addresses and the port numbers that are to be used by the two ends for setting up the call.

FIG. 1 shows the various steps implemented by the REFER method in the prior art.

During a step S2, the terminal of a calling party B sends an SIP "INVITE" message to a terminal of a first called party A. An SIP session is then set up between the calling party B and the first called party A. After the SIP session has been set up, a voice call is engaged between the calling party B and the first called party A.

Thereafter, e.g. at the request of the calling party B seeking to be transferred to a third party C, the first called party A sends an SIP REFER message to the calling party B (step S4). The REFER message contains an identifier of the first called party A, e.g. a uniform resource identifier (URI) address, an identifier of the third party C, e.g. a URI address, and a parameter "Replaces". The parameter "Replaces" tells the terminal of the calling party B that it has to replace the call set up between the calling party B and the first called party A by a call between the calling party B and the third party C.

On receiving the REFER message, the calling party B sends an acknowledgment message to the called party A in order to indicate that it accepts the request to make a transfer. Thereafter, the call between the calling party B and the first called party A is disconnected. The calling party B then sends an "INVITE" message to the third party C (step S6). An SIP session is set up between the calling party B and the third party C. Thereafter a voice call is engaged between the calling party B and the third party C.

When the call cannot be set up between the calling party B and the third party C, e.g. if the third party C cannot be reached, the SIP session between the calling party B and the third party C terminates.

At present, the implementations defined in the standards do not enable the call that was initially set up between the calling party B and the first called party A to be resumed in the event of the transfer failing or prior to the transfer being set up. In other words, the session initially set up between the called party A and the calling party B cannot be reactivated.

Thus, in the event of a failure, the calling user B needs to make a new call to the terminal of the first called party A, e.g. in order to ask to be transferred to some other party.

This situation is difficult for a caller to accept, particularly since this call resumption function is implemented in the conventional PSTN network.

In addition to a waste of time, the caller has the impression that the service is not as good as it used to be.

SUMMARY

An exemplary embodiment of the invention provides a supervision method for supervising a transfer of a call set up between first and second call terminals in a communications network implementing an SIP type signaling protocol, the method being characterized in that after sending a command to transfer the call that has been set up to a call between the first call terminal and a third call terminal, the method comprises the following steps:

obtaining at least one item of information relating to the setting up of the call between the first and third terminals;

verifying whether at least one non-set up criterion is true as a function of said at least one item of information; and sending a command to resume the call between the first and second terminals, as a function of the result of the verification.

The fact that the transferring terminal, i.e. the terminal requesting the transfer, obtains notifications concerning progress in the setting up of the transferred call makes it possible for the initial call to be set up again in the event of the transfer attempt failing, e.g. when the third party is absent or already busy. This also enables the call to be set up again at the request of the transferring user, e.g. as a result of a change of mind.

The supervision method thus makes it possible to set up the initial call once more in a manner that is simple and without requiring a new call, and consequently without requiring the address of the called terminal to be input once more.

In a particular implementation of the supervision method, the command for resuming the call is an SIP request including a predefined resumption parameter.

Thus, there is no need to create a new SIP command in order to install the method of an embodiment of the invention.

According to a particular characteristic of the supervision method, the SIP request is a message of the INVITE type and the predefined resumption parameter is a parameter of the REPLACES type.

The REPLACES type parameter is inserted together with existing parameters in the INVITE type SIP command. Introducing the REPLACES parameter in the INVITE command makes it possible to warn the terminal that initiated the call that the called terminal seeks to resume the call as initially set up.

According to a particular characteristic of the supervision method, a non-set up criterion may also be true as a function of a user request.

Thus, the transferring user who requested the transfer, can request resumption of the call with the party who originated the call. This is particularly advantageous if the transferring user observes, for example, that the transfer has been made to the wrong third party or if the transferring user has a change of mind before the transferred voice call is set up, i.e. before any data is exchanged.

According to a second characteristic used on its own or together with the above characteristic, a non-set up criterion may also be true as a function of a predetermined timeout delay.

This makes it possible to resume the initial call when the third party does not answer.

An embodiment of the invention also provides a processing method for processing a call set up between first and second call terminals in a communications network implementing an SIP type signaling protocol, the method being characterized in that following reception of a command to transfer the already-set up call to a call between the first terminal and a third terminal, the method comprises the following steps:
    transmitting at least one item of information relating to the setting up of a call between the first and third terminals;
    receiving a command to resume the call between the first and second terminals, said command being determined as a function of at least one non-set up criterion being found to be true as a function of said at least one transmitted item of information; and
    setting up a call between the first and second terminals as a function of the received resumption command.

On receiving a request from the initially called transferring terminal, the transferred terminal that originated the call suspends the attempt at setting up a call to the transfer destination and resumes the call with the transferring terminal. There is no need for the user originating the call to hang up and make a new call to the called terminal in the event of the transfer failing.

According to a particular characteristic of the processing method, the call between the first and third users is set up during a call session and the setting up step includes a step of modifying at least one parameter of said session that is being set up.

Modifying parameters of the current session enables processing to be simplified by limiting the number of signaling messages that are exchanged and by facilitating the routing steps.

In a particular implementation of the processing method, the session includes a third terminal identifier and the modification step comprises replacing the third terminal identifier with a second terminal identifier.

Replacing the destination in the SIP messages that are exchanged is a simple way of redirecting the signaling messages.

An embodiment of the invention also provides a supervision device for supervising a transfer of a call set up between first and second call terminals in a communications network implementing an SIP type signaling protocol, the device including means for transmitting a command to transfer the already-set up call to a call between the first terminal and a third terminal, the device being characterized in that it includes:
    means for obtaining at least one item of information relating to the setting up of the call between the first and third terminals;
    means for verifying whether at least one non-set up criterion is true as a function of said at least one item of information; and
    means for sending a command to resume the call between the first and second terminals, as a function of the result of the verification.

An embodiment of the invention also provides a processing device for processing a call set up between first and second terminals in a communications network implementing an SIP type signaling protocol, the device including means for receiving a command to transfer the already-set up call to a call between the first terminal and a third terminal, the device being characterized in that it includes:
    means for transmitting at least one item of information relating to the setting up of the call between the first and third terminals;
    means for receiving a command to resume the call between the first and second terminals, said command being determined as a function of the result of verifying whether at least one non-set up criterion is true as a function of said at least one transmitted item of information; and
    means for setting up a call between the first and second terminals as a function of the received resumption command.

An embodiment of the invention also provides a call terminal, characterized in that it includes a supervision device and/or a processing device as described above.

An embodiment of the invention also provides a signal carrying an SIP request transmitted after sending a command to transfer an already-set up call between first and second call terminals to a call between the first terminal and a third terminal in a communications network implementing an SIP type signaling protocol, the signal being characterized in that the request is a command to resume the call between the first and second terminals, said command being of the INVITE type and including a predefined resumption parameter.

An embodiment of the invention also provides a computer program product including instructions for implementing the steps of a supervision method as described above, when loaded in and executed by a processor.

Finally, an embodiment of the invention provides a computer program product including instructions for implementing the steps of a processing method as described above, when loaded in and executed by a processor.

BRIEF DESCRIPTION OF THE DRAWINGS

Other features and advantages appear from the following description of an implementation given by way of non-limiting example and with reference to the accompanying drawings, in which.

DETAILED DESCRIPTION OF ILLUSTRATIVE EMBODIMENTS

An implementation of an exemplary embodiment of the invention is described below with reference to FIGS. 2 and 3.

Figure 1:
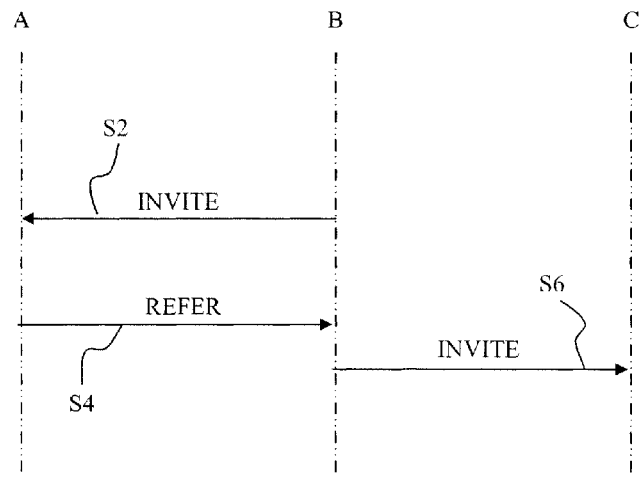
FIG. 1 is a diagram showing the various steps of a prior art transfer method.
Figure 2:
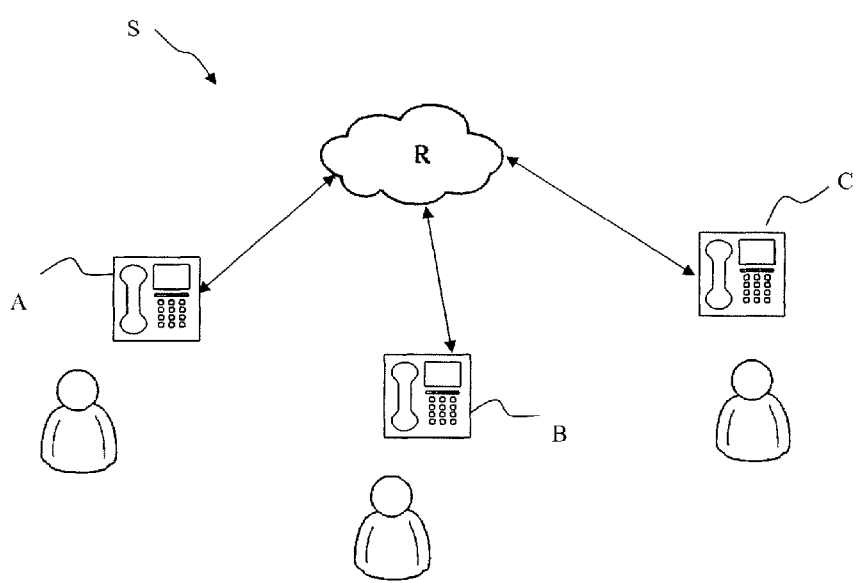
FIG. 2 is a general diagram showing the context of an embodiment of the invention.

With reference to FIG. 2, a system S has a plurality of user terminals A, B, C, . . . suitable for communicating with one another via a telecommunications network R.

The terminals A, B, C, . . . are call terminals that may be fixed or mobile and that are suitable for setting up telephone calls.

The network R is of the VOIP type, e.g. based on an IP multimedia subsystem (IMS) architecture.

The IMS architecture, as standardized by the third generation partnership project (3GPP) uses an SIP type signaling protocol and an RTP type data transfer protocol. In that architecture, the SIP signaling messages sent by a first terminal to a second terminal pass via one or more application servers (not shown). In known manner, the role of the application servers is in particular that of managing user profiles and of allocating IP addresses in the exchanged messages.

A signaling message sent from a first terminal and received by a second terminal transits in conventional manner via one or more application servers of the system. A message as sent may be completed or modified by one or more application servers while being routed. Since these modifications relate to form and not to content, the signaling message remains identical.

Thus, for reasons of clarity in the description, no description is given of the routing details for the various messages sent. It is assumed that a signaling message as sent by a first terminal is received by a second terminal.

Alternatively, the network R is an IP network based on an SIP signaling protocol.

Alternatively, the network R does not have application servers and the SIP signaling messages sent by a first terminal are received directly by a second terminal.

Figure 3:
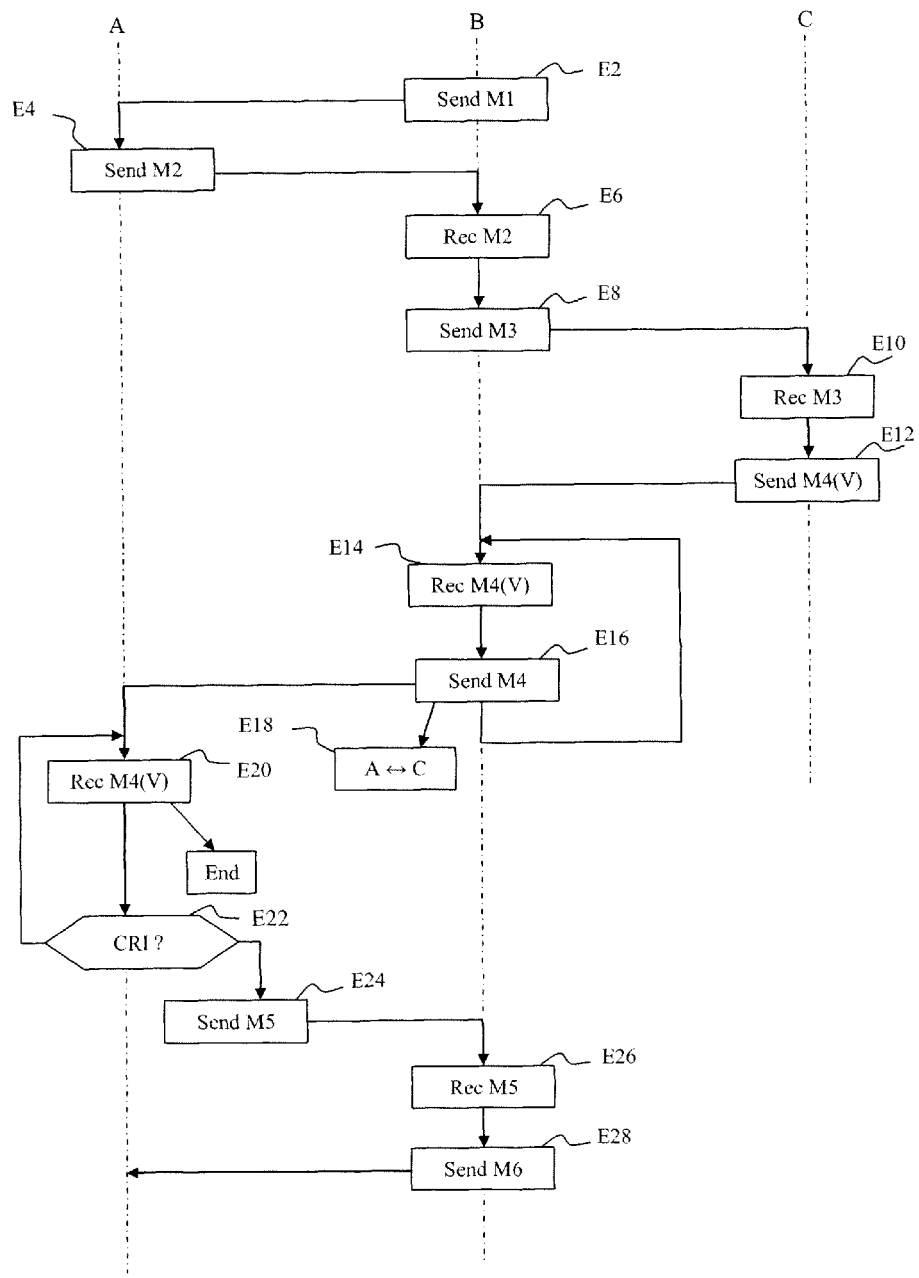
FIG. 3 is a diagram showing the main steps of a supervision method and of a call transfer processing method in a particular implementation of an embodiment of the invention.

With reference to FIG. 3, the various steps of a supervision method and of a processing method are described below.

The steps E20, E22, and E24 show the steps of the supervision method e.g. as performed by the terminal A.

The steps E16, E26, and E28 represent the steps of the processing method e.g. as performed by the terminal B.

In a step E2, a voice call between a calling party B and a first called party A is set up at the initiative of the calling party B.

The call is set up in conventional manner. More precisely, a terminal of the calling party B sends a message M1 requesting a call. The message M1 is an SIP "INVITE" signaling message sent to a terminal of the first called party A. An SIP session is set up between the terminal of the calling party B and the terminal of the first called party A. After the SIP session has been set up, a data call, e.g. a voice call is engaged between the calling party B and the called party A.

The terminal B of the calling party in this example represents a first terminal.

The terminal A of the first called party represents a second terminal.

During a step E4, e.g. performed following the request of the calling party B to be transferred to a third party C, the terminal of the first called party A sends a message M2 to the calling party B, the message M2 requesting a transfer. The message M2 is an SIP REFER signaling message and it contains an identifier of the first called party A, e.g. a URI address, an identifier of the third party C, e.g. a URI address, and a parameter "Replaces".

The third party C is considered in this example as being the second called party. The terminal C of the third party represents a third terminal in this example.

The first terminal B is the transferred terminal, the second terminal A is the transferring terminal, and the third terminal C is the transfer destination terminal.

The transfer request message M2 is received by the first terminal B during a step E6.

During a step E8, the first terminal of the calling party B then sends a transfer message M3 to the third party C in order to set up a call session. The transfer message M3 is an SIP "INVITE" signaling message. In known manner, the INVITE message serves to request the opening of a call session between the first terminal B and the third terminal C.

The call session includes an identifier of the requesting terminal, here an identifier of the first terminal B, and an identifier of the destination terminal, here the third terminal C. The identifier of the requesting terminal and the identifier of the destination terminal are parameters of the session.

The message M3 is received by the third terminal C during a step E10.

During a step E12, the third terminal C disconnects the voice call in progress between the calling party B and the first called party A and sends a notification message M4 to the first terminal B. The message M4 is a SIP NOTIFY signaling message. It contains a state flag V. The state flag V gives information relating to the setting up of the call between the first and third terminals. The state flag V represents the state of advance in progress in setting up the call between the first and third terminals, and for example it may indicate that set up has begun, that the terminal is ringing, that the line is busy, or indeed that the call has been set up. The values taken by the state flag V are standardized.

The notification message M4 is received by the first terminal B during a step E14.

During a step E16, the first terminal B forwards the received notification message M4 to the second terminal A.

If the state flag V contained in the notification message M4 indicates that the call has been set up, a voice call is then engaged between the calling party B and the third party C (step E18).

The notification message M4 is received by the second terminal A during a step E20.

If the state flag V contained in the received notification message M4 indicates that the call has been set up, the process stops.

If the state flag contained in the received notification message M4 indicates that the call has not yet been set up, the second terminal A acts during a step E22 to verify whether at least one non-set up criterion CRI is true. Examples of non-set up criteria CRI are described in detail below.

If during the verification step E22, no non-set up criterion CRI is found to be true, steps E12 to E22 are repeated.

Otherwise, i.e. if at least one non-set up criterion CRI is true, the second terminal A acts during a step E24 to send a resumption message M5 to the first terminal B.

The resumption message M5 is an SIP INVITE signaling message containing an identifier of the first terminal B, an identifier of the second terminal A, and a predefined resumption parameter P. By way of example, the resumption parameter P is a REPLACES parameter. Inserting the resumption parameter P in an SIP INVITE command makes it possible to use an existing command to perform the transfer resumption function. The REPLACES parameter is a standardized parameter. Use of the REPLACES parameter in an INVITE command indicates that call transfer must be interrupted and that the initial call between the first and second terminals should be set up again.

The resumption message M5 is received by the first terminal B during a step E26.

During a step E28, the first terminal B proceeds to set up a call with the second terminal A. For this purpose, it modifies the session parameters that are being set up with the third terminal C. More precisely, it replaces the identifier of the destination, which was an identifier for the third terminal C with an identifier for the second terminal A in the SIP signaling messages. It thus sends a message M6 to the second terminal A requesting the opening of a call. The call opening request message M6 is an SIP INVITE signaling message.

After the destination identifier has been changed in the parameters of the session that is being set up, the message M6 is sent to the first terminal A.

If the resumption message M5 is received by the first terminal B after voice communication has been engaged, the first terminal B does not take this message into account.

Examples of criteria CRI that might be found to be true during the verification step E22 are described below.

A first criterion CRI1 is, for example: "the value of the received state flag is 486". The value "486" indicates that the party's line is busy.

By way of example, a second criterion CRI2 is: "value of the received state flag is not 200 (call not yet set up) and the time that has elapsed since sending the transfer request message M2 is longer than a predetermined delay D, e.g. 10 seconds". This criterion corresponds to the situation in which the third party C does not answer.

By way of example a third criterion CRI3 is: "the value of the received state flag is not 200 (call yet not set up), and the party has requested resumption of the call". By way of example, the party may make a request to resume the call by pressing a predetermined key of a keypad of the terminal. By way of example, the resumption request is performed following an error in inputting the identifier of the party.

Alternatively, the number of criteria used may be different.

Figure 4:
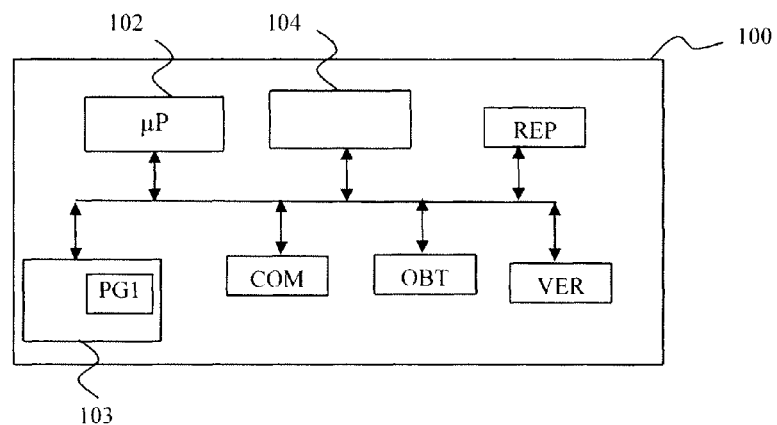
FIG. 4 is a block diagram showing a supervision device in an embodiment of the invention.

In a selected embodiment shown in FIG. 4, a supervision device implementing a supervision method for supervising a call transfer in accordance with an embodiment of the invention is constituted, for example, by a call terminal 100 that comprises in conventional manner in particular a processor unit 102 with a microprocessor, read only memory (ROM) or electrically erasable programmable ROM (EEPROM) 103, and a random access memory (RAM) 104.

In conventional and in non-exhaustive manner, the call terminal 100 may include the following elements: a keypad, a screen, a microphone, a loudspeaker, . . . .

The call terminal 100 also has a communications module COM suitable for setting up and/or receiving a call with a call terminal via a communications network R, an obtaining module OBT, a verification module VER, and a module REP for sending a resumption command.

The communications module COM is thus suitable for communicating with a first call terminal while setting up a call at the initiative of the first terminal.

The obtaining module OBT is suitable for receiving at least one item of information relating to the setting up of a call between the first terminal and a third terminal.

The verification module VER is suitable for verifying at least one non-set up criterion is true as a function of said at least one received item of information.

The resumption command module REP is suitable for commanding resumption of the call as set up at the initiative of the first terminal as a function of the result of the verification.

The ROM 103 includes registers storing a computer program PG1 including program instructions adapted to perform the steps of a method of an embodiment of the invention for supervising a call transfer.

On being switched on, the program PG1 stored in the ROM 103 is transferred into the RAM, which then contains executable code together with registers for storing the variables needed for implementing a step of obtaining at least one item of information relating to the setting up of the call between the first and third terminals, a step of verifying whether at least one non-set up criterion is true as a function of said at least one item of information, and a step of sending a resumption command for resuming the call between the first and second terminals, as a function of the result of the verification.

More generally, optionally removable storage means readable by a computer or by a microprocessor and optionally incorporated in the device store a program that enables the steps of a method of an embodiment of the invention for supervising a call transfer to be performed.

Figure 5:
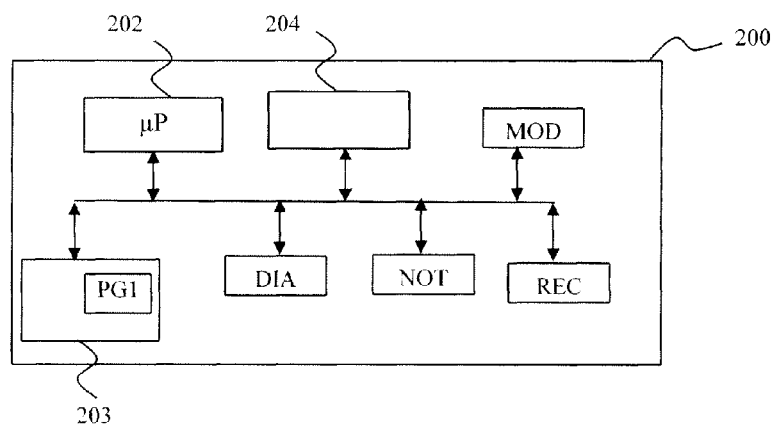
FIG. 5 is a block diagram showing a processor device in an embodiment of the invention.

In a particular embodiment as shown in FIG. 5, a processor device for implementing a method of processing the setting up of a call between first and second terminals in accordance with the invention may be constituted, for example, by a call terminal 200 that includes in conventional manner, in particular, a processor unit 202 having a microprocessor, a ROM or an EEPROM 203, and a RAM 204.

In conventional and non-exhaustive manner, the call terminal 200 may include the following elements: a keypad, a screen, a microphone, a loudspeaker, . . . .

The call terminal 200 also has a communications module DIA suitable for setting up and/or receiving a call with a call terminal via a communications network R, a notification transmission module NOT, a module REC for receiving a resumption command, and a modification module MOD.

The communications module DIA is thus suitable for setting up a call with a second terminal, for receiving a command to transfer the call that has been set up to a call with a third terminal, for initializing setting up a call with the third terminal on receiving the transfer request, and for receiving at least one item of information relating to the setting up of the call with the third terminal.

The notification transmission module NOT is suitable for transmitting at least one item of information relating to the setting up of the call that is being set up with the third terminal.

The module REC for receiving a resumption command is suitable for receiving a command to resume a call set up with the second terminal, said command being determined as a function of the result of verifying whether at least one non-set up criterion is true as a function of said transmission information.

The modification module MOD is suitable for setting up a call with the second terminal as a function of a received resumption command.

The ROM 203 has registers storing a computer program PG2 including program instructions adapted to perform the steps of a method for processing the setting up of a call between first and second terminals in a communications network implementing an SIP type signaling protocol of a main request to obtain a data stream.

On being switched on, the program PG2 stored in the ROM 503 is transferred into the RAM, which then contains executable code together with registers for storing the variables needed for implementing the steps for transmitting at least one item of information relating to the setting up of a call between the first and third terminals, for receiving a command to resume the call between the first and second terminals, said command being determined as a function of the result of verifying whether at least one non-set up criterion is true as a function of said transmission information, and for the setting up of a call between the first and second terminals as a function of the received resumption command.

More generally, optionally removable storage means readable by a computer or by a microprocessor, optionally integrated in the device, serve to store a program for implementing the steps of a method of an embodiment of the invention for processing the setting up of a call between the first and second terminals in a communications network implementing an SIP type signaling protocol.

An exemplary embodiment of the present disclosure provides a solution making it possible to resume a transferred call when the transfer is not set up.

Although the present disclosure has been described with reference to one or more examples, workers skilled in the art will recognize that changes may be made in form and detail without departing from the scope of the disclosure and/or the appended claims.

The invention claimed is:

1. A supervision method comprising:
supervising a transfer of a call set up between first and second call terminals with a supervision device in a communications network implementing an SIP type signaling protocol, wherein supervising comprises the following steps performed after sending a command to transfer the call that has been set up to a call between the first call terminal and a third call terminal and after a disconnection of the call between the first and the second terminals, that disconnection being caused by said command to transfer:
obtaining, by the supervision device, at least one item of information relating to progress in setting up the call between the first and third terminals;
verifying with the supervision device whether at least one non-set up criterion is true as a function of said at least one item of information; and
sending a command from the supervision device to resume the call between the first and second terminals, if the non-set up criterion is true.

2. The supervision method according to claim 1, wherein the command for resuming the call is an SIP request including a predefined resumption parameter.

3. The supervision method according to claim 2, wherein the SIP request is a message of the INVITE type and the predetermined resumption parameter is a parameter of the REPLACES type.

4. The supervision method according to claim 1, wherein a non-set up criterion may also be true as a function of a user request.

5. The supervision method according to claim 1, wherein a non-set up criterion may also be true as a function of a predetermined timeout delay.

6. A processing method for processing a call set up between first and second call terminals in a communications network implementing an SIP type signaling protocol, wherein the method comprises the following steps performed following reception of a command to transfer the already-set up call to a call between the first terminal and a third terminal and after a disconnection of the call between the first and the second terminals, that disconnection being caused by said command to transfer:
transmitting from a processing device at least one item of information relating to progress in setting up the call between the first and third terminals;
receiving with the processing device a command to resume the call between the first and second terminals, said command being determined as a function of at least one non-set up criterion being found to be true as a function of said at least one transmitted item of information; and
setting up a call between the first and second terminals as a function of the received command to resume.

7. The processing method according to claim 6, wherein the call between the first and third users is set up during a call session and the step of setting up the call between the first and second terminals includes a step of modifying at least one parameter of said session.

8. The processing method according to claim 7, wherein the session includes a third terminal identifier and the modification step comprises replacing the third terminal identifier with a second terminal identifier.

9. A supervision device for supervising a transfer of a call set up between first and second call terminals in a communications network implementing an SIP type signaling protocol, the device comprising:
means for transmitting a command to transfer the already-set up call to a call between the first terminal and a third terminal, said command causing a disconnection of the call between the first and the second terminals;
means for obtaining, after transmitting the command and causing the disconnection, at least one item of information relating to progress in setting up the call between the first and third terminals;
means for verifying whether at least one non-set up criterion is true as a function of said at least one item of information; and
means for sending a command to resume the call between the first and second terminals, if the non-set up criterion is true.

10. A processing device for processing a call set up between first and second terminals in a communications network implementing an SIP type signaling protocol, the device comprising:
means for receiving a command to transfer the already-set up call to a call between the first terminal and a third terminal, said command to transfer causing a disconnection of the call between the first and the second terminals;

means for transmitting, after transmitting the command and causing the disconnection, at least one item of information relating to progress in setting up of the call between the first and third terminals;

means for receiving a command to resume the call between the first and second terminals, said command being determined as a function of a result of verifying whether at least one non-set up criterion is true as a function of said at least one transmitted item of information; and means for setting up a call between the first and second terminals as a function of the received command to resume.

11. A call terminal comprising a supervision device according to claim 9.

12. A non-transitory computer readable memory comprising a computer program product stored thereon and including instructions for implementing steps of a supervision method, when loaded in and executed by a processor, wherein the instructions comprise:

instructions configured to cause the processor to supervise a transfer of a call set up between first and second call terminals in a communications network implementing an SIP type signaling protocol, wherein supervising comprises the following steps performed after sending a command to transfer the call that has been set up to a call between the first call terminal and a third call terminal and after a disconnection of the call between the first and the second terminals, that disconnection being caused by said command to transfer:

obtaining, by the processor, at least one item of information relating to progress in setting up the call between the first and third terminals;

verifying whether at least one non-set up criterion is true as a function of said at least one item of information; and sending a command to resume the call between the first and second terminals, if the non-set up criterion is true.

13. A non-transitory computer readable memory comprising a computer program product stored thereon and including instructions for implementing steps of a processing method, when loaded in and executed by a processor, wherein the instructions comprise:

instructions configured to cause the processor to process a call set up between first and second call terminals in a communications network implementing an SIP type signaling protocol, wherein processing comprises the following steps performed following reception of a command to transfer the already-set up call to a call between the first terminal and a third terminal and after a disconnection of the call between the first and the second terminals, that disconnection being caused by said command to transfer:

transmitting at least one item of information relating to progress in setting up the call between the first and third terminals;

receiving a command to resume the call between the first and second terminals, said command being determined as a function of at least one non-set up criterion being found to be true as a function of said at least one transmitted item of information; and setting up a call between the first and second terminals as a function of the received command to resume.

14. A call terminal comprising a processing device according to claim 10.

\* \* \* \* \*